United States Patent
Marcin et al.

(10) Patent No.: US 12,388,945 B2
(45) Date of Patent: Aug. 12, 2025

(54) APPLICATION OF DOLLY ZOOM EFFECT TO VIDEOS

(71) Applicant: GoPro, Inc., San Mateo, CA (US)

(72) Inventors: Téo Marcin, Ile-de-France (FR); Thomas Crozier, Vanves (FR); Séraphin Cyrille Philippe Bonnaffé, San Mateo, CA (US); Tuan Phuc Phan, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 48 days.

(21) Appl. No.: 18/354,488

(22) Filed: Jul. 18, 2023

(65) Prior Publication Data

US 2025/0030812 A1   Jan. 23, 2025

(51) Int. Cl.
*H04N 5/262* (2006.01)
*G06T 7/246* (2017.01)
*G06T 7/60* (2017.01)
*G06V 20/40* (2022.01)
*H04N 23/68* (2023.01)
*H04N 23/69* (2023.01)

(52) U.S. Cl.
CPC ........... *H04N 5/2628* (2013.01); *G06T 7/248* (2017.01); *G06T 7/60* (2013.01); *G06V 20/41* (2022.01); *H04N 23/683* (2023.01); *H04N 23/69* (2023.01); *G06T 2207/10016* (2013.01); *G06T 2207/20092* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2021/0109312 A1* | 4/2021 | Honjo | G03B 15/006 |
| 2021/0144304 A1* | 5/2021 | Stimm | H04N 23/69 |
| 2023/0334619 A1* | 10/2023 | Chen | H04N 23/69 |

FOREIGN PATENT DOCUMENTS

CN   114697517 A   *   7/2022

* cited by examiner

*Primary Examiner* — Hung Q Dang
(74) *Attorney, Agent, or Firm* — Esplin & Associates, PC (57) ABSTRACT

Visual content captured by an image capture device may be stabilized. A target depicted within visual content of a video may be identified manually by a user or automatically by a computing device. Dolly zoom visual content may be generated by using a viewing window to crop the visual content. The size and/or the position of the viewing window within the visual content may change based on size and/or the position of the target within the visual content. The combination of video stabilization, target tracking, and cropping of the visual content may produce the dolly zoom effect. The dolly zoom effect may compensate for the movement of the image capture device and work on video captured by an image capture device without optical zoom.

20 Claims, 7 Drawing Sheets

APPLICATION OF DOLLY ZOOM EFFECT TO VIDEOS

FIELD

This disclosure relates to applying a dolly zoom effect to videos.

BACKGROUND

A dolly zoom effect may be difficult and time consuming for a user to apply because it involves multiple, precise steps. For example, a dolly zoom effect may require zooming-in while moving away from a subject or zooming-out while moving towards the subject, and maintaining the subject in the center of the image. Synchronizing changes in the video with corresponding zoom may be complex to achieve.

SUMMARY

This disclosure relates to applying a dolly zoom effect. Video information and/or other information may be obtained. The video information may define a video. The video may have a progress length. The video may include visual content viewable as a function of progress through the progress length. A target depicted within the visual content may be identified. Size of the target depicted within the visual content may be determined as the function of progress through the progress length. A viewing window for the visual content may be determined as the function of progress through the progress length based on the size of the target depicted within the visual content as the function of progress through the progress length and/or other information. The viewing window may define extents of the visual content to be included within dolly zoom visual content as the function of progress through the progress length. The dolly zoom visual content may be generated based on the viewing window and/or other information. The dolly zoom visual content may include the extents of the visual content defined by the viewing window.

A system for applying a dolly zoom effect, may include one or more electronic storage, processor, and/or other components. The electronic storage may store video information, information relating to a video, information relating to visual content, information relating to a target, information relating to size of the target, information relating to a viewing window, information relating to dolly zoom visual content, and/or other information.

The processor(s) may be configured by machine-readable instructions. Executing the machine-readable instructions may cause the processor(s) to facilitate applying a dolly zoom effect. The machine-readable instructions may include one or more computer program components. The computer program components may include one or more of a video component, a target component, a depiction component, a viewing window component, a dolly zoom component, and/or other computer program components.

The video component may be configured to obtain video information and/or other information. The video information may define a video. The video may have a progress length. The video may include visual content viewable as a function of progress through the progress length of the video. In some implementations, the video may be stabilized. In some implementations, the video may include a normal speed video, a slow speed video, or a fast speed video.

The target component may be configured to identify a target depicted within the visual content. In some implementations, identification of the target depicted within the visual content may include identification of a bounding box for the target. In some implementations, identification of the target depicted within the visual content may include selection of an object or identification of a region of interest within the visual content.

The depiction component may be configured to determine the size of the target depicted within the visual content as the function of progress through the progress length of the video. In some implementations, determination of the size of the target depicted within the visual content as the function of progress through the progress length may include determination of a diagonal of the bounding box for the target as the function of progress through the progress length.

In some implementations, trackability and distances between points of the object or points within the region of interest within the visual content may be determined. Tracking points may be identified based on the trackability and the distances between the points of the object or the points within the region of interest within the visual content.

The viewing window component may be configured to determine a viewing window for the visual content. The viewing window for the visual content may be determined as the function of progress through the progress length of the video based on the size of the target depicted within the visual content as the function of progress through the progress length of the video and/or other information. The viewing window may define extents of the visual content to be included within dolly zoom visual content as the function of progress through the progress length of the video.

In some implementations, a zoom factor for the target may be determined based on a reference frame diagonal of the bounding box for the target, a current frame diagonal of the bounding box for the target, and/or other information. The size of the viewing window may be determined based on the zoom factor for the target and/or other information.

In some implementations, the size of the viewing window may be determined based on distances between the tracking points and/or other information. In some implementations, the viewing window may be placed within the visual content based on a center point between the tracking points and/or other information.

In some implementations, the visual content may be stored in a buffer. The size of the viewing window for the visual content stored in the buffer may change across frames. The changes in the size of the viewing window for the visual content stored in the buffer may be smoothed.

The dolly zoom component may be configured to generate dolly zoom visual content. The dolly zoom visual content may be generated based on the viewing window and/or other information. The dolly zoom visual content may include the extents of the visual content defined by the viewing window.

In some implementations, the dolly zoom visual content may include depiction of a scene including the target. The size and/or the position of the target may be maintained across multiple frames of the dolly zoom visual content. The field of view of the scene may be changed across the multiple frames of the dolly zoom visual content.

In some implementations, the dolly zoom visual content may be generated as the visual content is captured by an image capture device. The dolly zoom visual content may be presented on an electronic display as the visual content is captured by the image capture device.

In some implementations, generation of the dolly zoom visual content may be stopped based on resolution of the target within the visual content and/or the dolly zoom visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
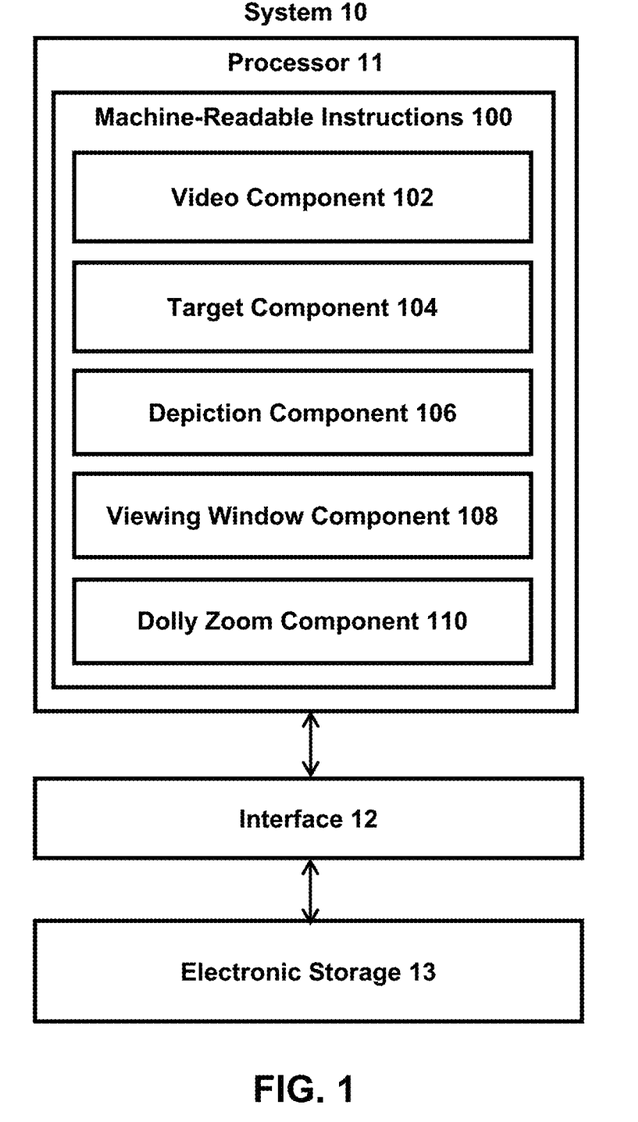
FIG. 1 illustrates a system for applying a dolly zoom effect.

FIG. 1 illustrates a system 10 for applying a dolly zoom effect. The system 10 may include one or more of a processor 11, an interface 12 (e.g., bus, wireless interface), an electronic storage 13, and/or other components. Video information and/or other information may be obtained by the processor 11. The video information may define a video. The video may have a progress length. The video may include visual content viewable as a function of progress through the progress length. A target depicted within the visual content may be identified by the processor 11. Size of the target depicted within the visual content may be determined by the processor 11 as the function of progress through the progress length. A viewing window for the visual content may be determined by the processor 11 as the function of progress through the progress length based on the size of the target depicted within the visual content as the function of progress through the progress length and/or other information. The viewing window may define extents of the visual content to be included within dolly zoom visual content as the function of progress through the progress length. The dolly zoom visual content may be generated by the processor 11 based on the viewing window and/or other information. The dolly zoom visual content may include the extents of the visual content defined by the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to a target, information relating to size of the target, information relating to a viewing window, information relating to dolly zoom visual content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

A dolly zoom effect may be applied to the visual content to manipulate/change the visual content. A dolly zoom effect may refer to manipulation of visual content to change visual perception of things depicted within the visual content. A dolly zoom effect may change the field of view of the visual content that is presented (e.g., shown on an electronic display, included within a video frame) while keeping the target static within the presentation. A dolly zoom effect may maintain the size and/or the position of a target depicted within the visual content while changing the field of view of the scene depicted within the visual content. A dolly zoom effect may maintain size and/or position of the target(s) across multiple frames of the video while changing field of view of the scene depicted across the multiple frames of the video.

Application of the dolly zoom effect may result in the target appearing to stay in the same position without changing size while other portions of the visual content appearing to be squeezed or stretched. For example, the size and the position of a particular object depicted within the visual content may remain the same/not change more than a threshold amount while the amount of the scene depicted within the visual content may increase or decrease. For instance, the amount of the field of view of the visual content being presented may be increased (simulating zooming out) while increasing the size of the target to maintain the position and/or the size of the target within the video frames. The amount of the field of view of the visual content being presented may be decreased (simulating zooming in) while decreasing the size of the target to maintain the position and/or the size of the target within the video frames.

Applying the dolly zoom effect to a video may be difficult to do manually since precise changes in the captured field of view along with corresponding changes in zoom may need to be applied. The present disclosure provides an automated tool to apply the dolly zoom effect to a video. A target depicted in the visual content of a video is tracked and a viewing window is used to crop the visual content to apply the dolly zoom effect to the video. The target may be tracked using object detection and/or tracking points. The techniques of the present disclosure may be used during video capture to apply the dolly zoom effect as visual content of the video is being captured. The techniques of the present disclosure may be used after video capture to apply the dolly zoom effect to visual content of the video that has been captured. The techniques of the present disclosure may be used by an image capture device or another computing device (e.g., mobile device, desktop device) to apply the dolly zoom effect. The techniques of the present disclosure may be used to apply the dolly zoom effect to a normal speed video, a slow speed video (slow-motion video), and/or a fast speed video (e.g., time-lapse video).

For example, an image capture device may capture and stabilize the visual content of a video. A target depicted within the visual content may be identified manually by a user or automatically by the image capture device. Dolly zoom visual content may be generated by using a viewing window to crop the visual content. The size and/or the position of the viewing window within the visual content may change based on size and/or the position of the target within the visual content. The combination of video stabilization, target tracking, and cropping of the visual content may produce the dolly zoom effect. The dolly zoom effect may compensate for the movement of the image capture device and work on video captured by an image capture device without optical zoom.

For example, the target may include a face. The dolly zoom visual content for the face may be generated by (1) positioning the viewing window to keep the face in the middle of the viewing window and (2) changing the size of the viewing window (changing the zoom) to maintain the size of the face within the viewing window/dolly zoom visual content. Once the face is detected within the visual content, a user may move the image capture device towards or away from the face. The position and/or the size of the viewing window may automatically change so that the face appears to be at the same location and appears to be the same size in the dolly zoom visual content (final video).

As another example, the target within a video may be identified based on user-identification of a region of interest within the visual content of the video. Points within the region of interest may be analyzed over the progress length of the video to select tracking points to be used for the target. The location of tracking points within the images/video frames may be used to determine the size and/or the location of the viewing window for the image/video frames so that the target appears to be at the same location and appears to be the same size in the dolly zoom visual content (final video).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate applying a dolly zoom effect. The machine-readable instructions 100 may include one or more computer program components. The machine-readable instructions 100 may include one or more of a video component 102, a target component 104, a depiction component 106, a viewing window component 108, a dolly zoom component 110, and/or other computer program components.

The video component 102 may be configured to obtain video information and/or other information. Obtaining video information may include one or more of accessing, acquiring, analyzing, capturing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to apply a dolly zoom effect to a video. The video information defining a video may be obtained based on the user's selection of the video through the user interface/video application. Other selections of video for retrieval of video information are contemplated.

The video information may define a video. The video may have a progress length. The video may include visual content, audio content, and/or other content. The video may include visual content, audio content, and/or other content viewable/playable as a function of progress through the progress length. The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content and/or other content of the video. Other types of video information are contemplated.

The visual content may have a field of view. The field of view of the visual content may refer to a portion of a scene that was observed by one or more image capture devices in capturing the visual content. The field of view may refer to the extent (e.g., angle, size) of the scene that is captured within the visual content. The portion of the scene within the field of view may change during the progress length of the video. The video may be captured by an image capture device while the image capture device is moving. The video may be captured by an image capture device while the image capture device is moving towards or away from a target in the scene.

In some implementations, the video may include a spherical video. The field of view of the visual content of a spherical video may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

The video may include a normal speed video, a slow speed video, or a fast speed video. A normal speed video may refer to a video that was captured/generated with a sampling rate (e.g., capture frame rate) that is same as the playback rate. A slow speed video may refer to a video that was captured/generated with a sampling rate that is higher/faster than the playback rate, such as a slow motion video. A fast speed video may refer to a video that was captured/generated with a sampling rate that is lower/slower than the playback rate, such as a time-lapse video.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

In some implementations, the video may be stabilized. The video may be stabilized to provide a more stable view of the visual content. The video may be stabilized during capture of the video or after the capture of the video. Use of the stabilized video may enable the dolly zoom effect to be applied with less processing. For example, use of the stabilized video may enable the dolly zoom effect to be applied by automatically changing the size of the viewing window and without changing the position of the viewing window. The video may be stabilized to provide a stable depiction of a scene, and the dolly zoom effect may be applied by simply changing the size of the viewing window with the same position. That is, while the size of the viewing window may change based on the size of the target depicted within the video, the position of the viewing window may remain the same/static.

The visual content may include depiction of a scene including one or more things. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

One or more video frames of a video may include depiction of a scene. One or more video frames of a video may include depiction of one or more things. The visual content may include depiction of a living thing and/or a non-living thing. The visual content may include depiction of the entirety of a thing or one or more parts of the thing. For example, the visual content may include depiction of a person or parts of a person (e.g., a person's face). For instance, the visual content of the video may be captured by an image capture device that includes the person within the field of view of the image capture device. The visual content of the video may be captured by an image capture device that moves towards or away from the thing(s) within the scene.

The depiction of a thing within the visual content may move during the progress length of the video. For example, the thing and/or the image capture device capturing the video may move during capture of the video. For instance, the image capture device may move towards or away from a target during capture of the video. Such movement may cause the depiction of the thing to change within the field of view of the visual content. For example, location, size, and/or the shape of the thing may change due to the movement of the thing and/or the movement of the image capture device.

The target component 104 may be configured to identify a target depicted within the visual content. Identifying a target depicted within the visual content may include ascertaining, detecting, determining, establishing, finding, indicating, locating, obtaining, and/or otherwise identifying the target depicted within the visual content. Identifying a target depicted within the visual content may include identifying type, location, size, shape, and/or other characteristics of the target within the visual content. The target component 104 may be configured to identify a target depicted within the visual content as a function of progress through the progress length of the video. The target may be identified within different video frames of the video.

A target may refer to a thing that is selected for application of a dolly zoom effect. A target may refer to a particular thing that is distinguished from other things for application of a dolly zoom effect. A target may refer to a thing that provides a reference for application of a dolly zoom effect. A target may include a thing (living thing, non-living thing) within the scene captured within the visual content. A target may include a combination of things (e.g., a person on a bicycle). A target may include a combination of living thing, a combination of non-living thing, or a combination of living thing(s) and non-living thing(s).

A target depicted within the visual content may be identified based on analysis of the visual content, user selection, and/or other information. Analysis of visual content may include analysis of the content of the video frames of the video, such as analysis of the arrangement of pixels, characteristics of pixels, values of pixels, and/or other aspects of pixels of the visual content. Analysis of visual content may include use of computer vision and/or other object detection, recognition, saliency, and/or segmentation techniques to identify a target depicted within the visual content. User selection of the target may refer to user input that identifies a particular thing depicted within the visual content as a target. For example, a user may interact with a user interface to identify a grouping of pixels (e.g., by drawing a shape around the pixels, by marking/tagging the pixels) as depicting a target. Other identification of target(s) depicted within the visual content is contemplated.

In some implementations, identification of the target depicted within the visual content may include selection of an object within the visual content. For example, a view of the visual content may be presented on an electronic display (e.g., touchscreen display), and a user may interact with the electronic display to select a particular object as the target of a dolly zoom effect. Other selection of object is contemplated.

In some implementations, identification of the target depicted within the visual content may include identification of a bounding box for the target. For example, when an object within the visual content is selected as a target, a bounding box for the target may be identified. The bounding box for the target may be automatically or manually identified. For example, referring to FIG. 3, a bounding box 320 for the face 310 may be identified.

In some implementations, identification of the target depicted within the visual content may include identification of a region of interest within the visual content. A region of interest may refer to a spatial portion of the visual content that has been marked as including the target. For example, a view of the visual content may be presented on an electronic display, and a user may interact with the electronic display to draw the region of interest that includes the target. Other identification of the region of interest is contemplated.

Figure 3:
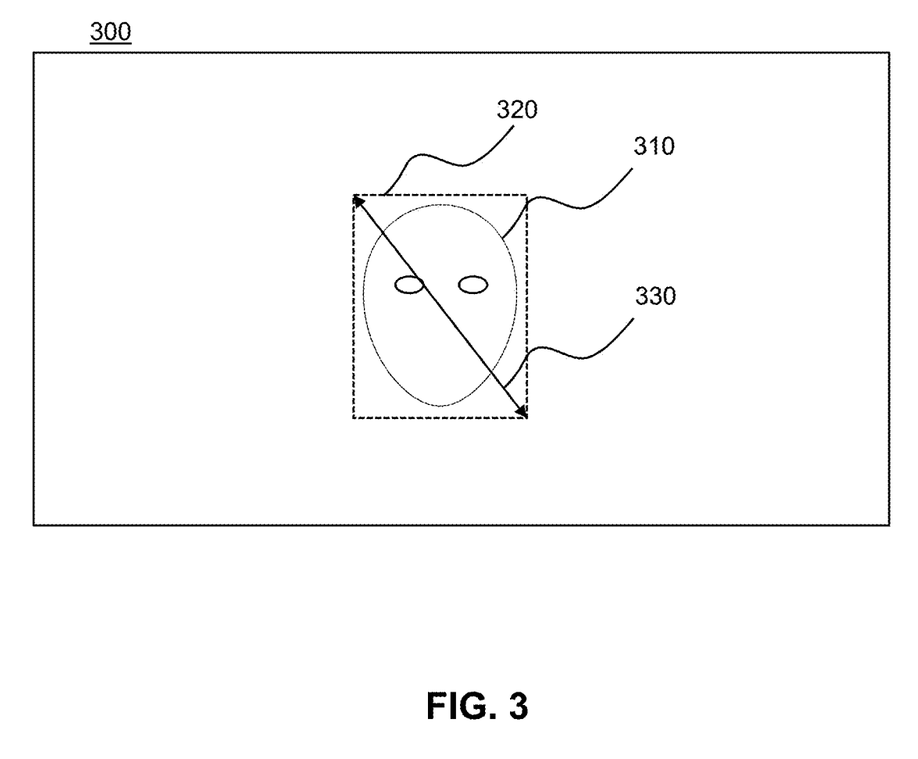
FIG. 3 illustrates an example identification of a target in visual content.

FIG. 3 illustrates an example identification of a target in visual content. An image 300 may include visual content. The image 300 may include depiction of a face 310. The face 310 may be identified as a target. The face 310 may be manually identified by a user. The face 310 may be automatically identified by a computing device.

Figure 4A:
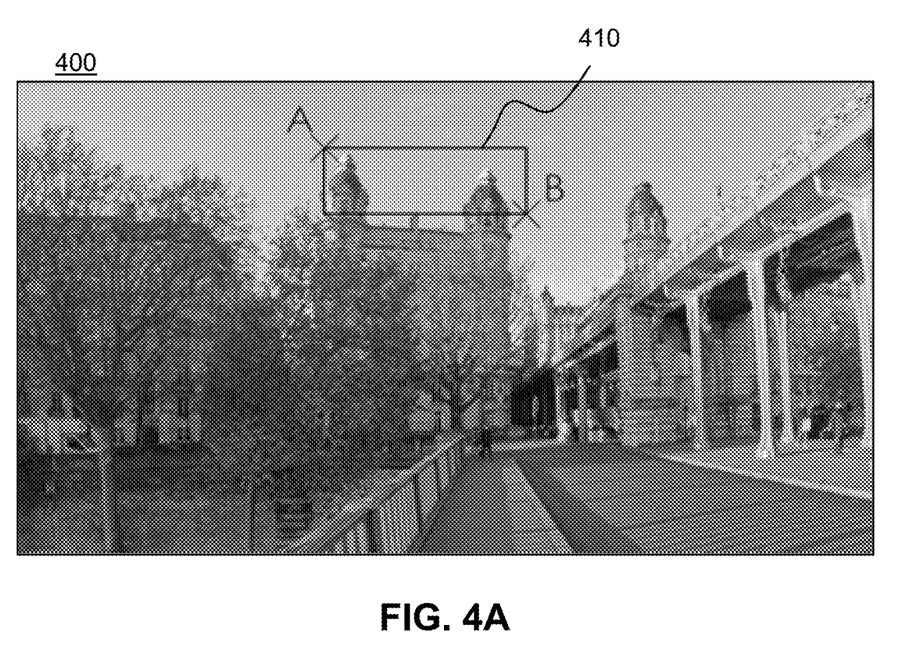
FIG. 4A illustrates an example identification of a target in visual content.

FIG. 4A illustrates an example identification of a target in visual content. An image 400 may include visual content. The image 400 may include depiction of a building. A part of the building may be identified as a target. The part of the building may be identified as a target based on identification of a region of interest 410. For example, a user may identify the region of interest 410 by designating/marking two corner points (A, B) of a rectangle. While the region of interest is shown in 4A as a rectangle, this is merely an example and is not meant to be limiting. Use of other shapes for region of interest is contemplated, The depiction component 106 may be configured to determine one or more characteristics of the target depicted within the visual content. Determining a characteristic of the target may include ascertaining, approximating, calculating, establishing, estimating, finding, identifying, quantifying, and/or otherwise determining the characteristic of the target. The characteristic(s) of the target may be determined as the function of progress through the progress length of the video. The characteristic(s) of the target may be determined for different video frames of the video. Example characteristics of the target may include size, location, shape, type, and/or other characteristics of the target. The characteristic(s) of the target at a particular moment in the progress length of the video/in a particular video frame may be identified as reference characteristic(s). For example, the size and/or the position of the target at a particular moment in the progress length of the video/in a particular video frame may be identified as the reference size and/or the reference position for application of the dolly zoom effect. The reference size may refer to the size of the target that is to be maintained in the dolly zoom visual content via the application of the dolly zoom effect. The reference position may refer to the position of the target that is to be maintained in the dolly zoom visual content via the application of the dolly zoom effect.

In some implementations, a user may be provided with one or more options to set the reference size and/or the reference position for the target. For example, the visual content may be presented on an electronic display, as the user may control the zoom (e.g., via pinch/stretch, via interaction with a zoom slider) and/or the viewing window/crop position to control how big and/or where the target is to be presented within the dolly zoom visual content.

In some implementations, a user may be guided in capturing the visual content for application of the dolly zoom effect. For example, application of the dolly zoom effect for visual content captured while moving away from the target may include zooming in on the captured visual content. Application of the dolly zoom effect for visual content captured while moving towards the target may include zooming out of the captured visual content. Application of the dolly zoom effect for visual content captured while moving towards the target may benefit from having extra room in which the viewing window may grow in size. The user may be prompted to choose between the dolly zoom effect for moving towards the target or the dolly zoom effect for moving away from the target.

Responsive to user selection of the dolly zoom effect for moving away from the target, the user may be prompted (e.g., via one or more messages and/or visual representations presented on an electronic display of the image capture device) to position the image capture device with respect to the target to choose the reference size for the target. After the reference size for the target has been chosen, the visual content capture may be started. The user may be prompted to move the image capture device away from the target as the visual content is captured by the image capture device.

Responsive to user selection of the dolly zoom effect for moving towards from the target, the user may be prompted to position the image capture device with respect to the target to choose the reference size for the target. After the reference size for the target has been chosen, the user may be prompted to step away from the target to increase the field of view of the scene that is initially captured by the image capture device. After the user has added distance between the image capture device and the target (and thereby increase the field of view of the scene captured by the image capture device), the visual content capture may be started. As another example, the user may be prompted to digitally zoom in on the target to choose the reference size of the target. The visual content capture may be started without the digital zoom, which may increase the increase the field of view of the scene captured by the image capture device. The user may be prompted to move the image capture device towards the target as the visual content is captured by the image capture device.

After the visual content capture has started, the user may be prompted to move towards or away from the target. The dolly zoom visual content may be presented on the electronic display of the image capture device during visual content capture so the user can see how the dolly zoom visual content is being created based on the movement of the image capture device towards or away from the target.

In some implementations, determination of the size of the target depicted within the visual content as the function of progress through the progress length may include determination of a diagonal of the bounding box for the target as the function of progress through the progress length. For example, referring to FIG. 3, a diagonal 330 of the bounding box 320 for the face 312 may be identified for different moments within the video. The diagonal of the bounding box for the target may be used as the size of the target. The diagonal of the bounding box for the target may be used to determine the size of the viewing window/crop used (e.g., zoom factor) to apply the dolly zoom effect. The size of the viewing window/crop may be changed so that the length of the diagonal is maintained (remain the same, not change more than a threshold amount) after the dolly zoom effect is applied.

In some implementations, determination of the size of the target depicted within the visual content may include determination of tracking points within the visual content. Tracking points may refer to points/features of the target that is tracked across different moments/video frames in the video. Tracking points may refer to points/features of the target that is tracked to determine characteristics of the target, such as the size of the target and/or the position of the target.

The trackability and distances between points of the object or points within the region of interest within the visual content may be determined. Trackability of points may refer to the quality of the points of being tracked across different moments/video frames in the video. Trackability of points may refer to the quality of the points being able to be tracked throughout the video. Distances between points may refer to the amount of space/number of pixels between the points.

The tracking points may be identified based on the trackability and the distances between the points of the object or the points within the region of interest within the visual content. For example, individual points or combination of points of the object/within the region of interest throughout the video may be analyzed to identify points/combination of points with highest/most stable trackability. For example, the trackability of points/combination of points may be determined using Harris corner detector and/or other detectors. The points/combination of points with the highest trackability (e.g., highest Harris score) with long distance between the points (e.g., longest distance, distance longer than a threshold distance) may be selected as tracking points for the target.

The tracking points may be tracked to determine the characteristic(s) of the target throughout the video. In some implementations, the efficiency of tracking may be increased via searching for tracking pixels in a small window (size defined by tuning) around its prior position. The tracking may be performed using optical flow, the iterative Lucas-Kanade method with pyramids, and/or other tracking techniques.

Figure 4B:
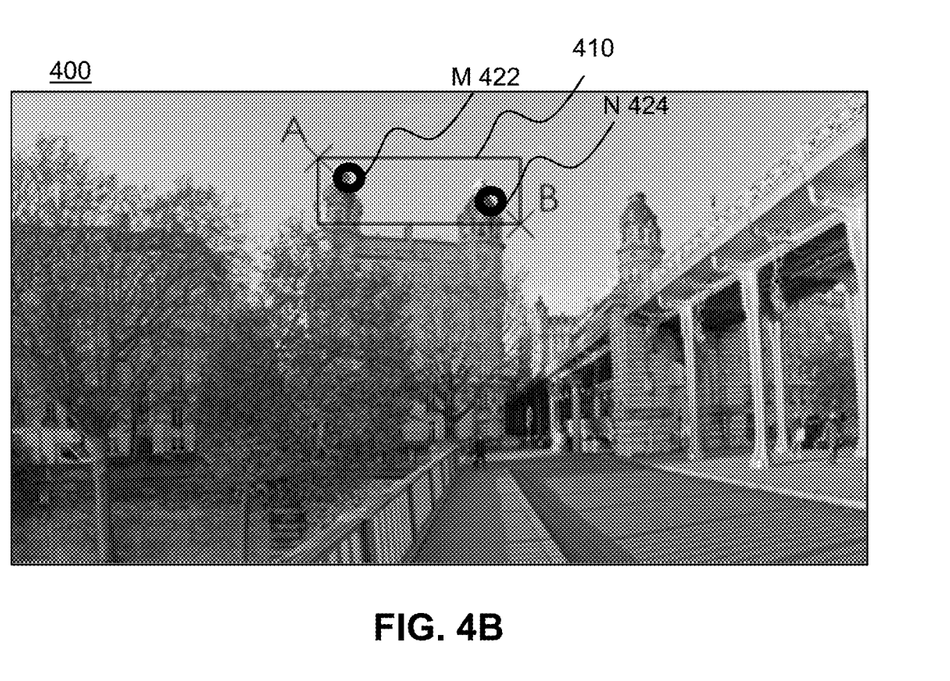
FIG. 4B illustrates example tracking points for a target in visual content.

FIG. 4B illustrates example tracking points for a target in visual content. In the image 400, tracking points 422, 424 may be identified within the region of interest 410. For example, the tracking points 422, 424 may be identified to track the target in the image 400 based on high trackability and closeness to the edges/corners of the region of interest 410. The tracking points 422, 424 may be used to determine the characteristics of the target for the application of the dolly zoom effect.

Figure 4C:
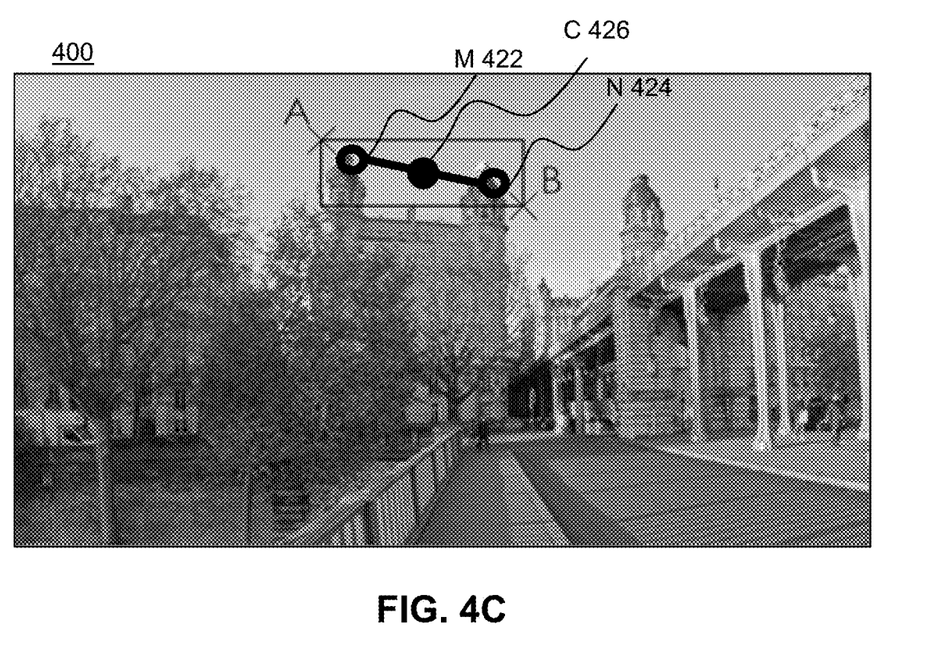
FIG. 4C illustrates an example center of tracking points for a target in visual content.

For example, the distance between the tracking point M 422 and the tracking point N 424 in individual video frames may be used to determine the size of the target. The center of the tracking points 422, 424 may be used to determine the position of the target. For example, referring to FIG. 4C, a center tracking point C 426 of the tracking points 422, 424 may be identified as the position of the target. While FIGS. 4B and 4C show use of two tracking points to determine the size and the position of the target, this is merely an example and is not meant to be limiting. User of other numbers of tracking points is contemplated.

The viewing window component 108 may be configured to determine a viewing window for the visual content. The viewing window may define extents of the visual content. The viewing window may define extents of the visual content to be included within dolly zoom visual content as the function of progress through the progress length of the video. The viewing window may define which portions of the visual content are included within the dolly zoom visual content at different moments within the progress length of the video.

The viewing window may be used to provide a punchout of the visual content. A punchout of the visual content may refer to an output of one or more extents of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). The punchout of the visual content may be presented on one or more electronic displays, included in one or more videos, and/or otherwise used for presenting dolly zoom view of the visual content.

Determining a viewing window may include ascertaining, approximating, calculating, establishing, estimating, finding, identifying, quantifying, and/or otherwise determining the viewing window. Determining a viewing window may include determining one or more characteristics of the viewing window, such as the size, the position, and/or other characteristics of the viewing window. The size of the viewing window may determine the zoom of the visual content for the dolly zoom effect. The position of the viewing window within the visual content may determine the framing of the visual content for the dolly zoom effect. The viewing window component 108 may be configured to determine how the viewing window is placed within the field of view of the visual content. The placement of the viewing window (including size and/or location of the viewing window) may be determined to offset changes in the depiction of the target so that the size and/or the position of the target within the dolly zoom visual content does not change/not change more than a threshold amount.

The viewing window for the visual content may be determined as the function of progress through the progress length of the video based on the characteristic(s) of the target depicted within the visual content as the function of progress through the progress length of the video and/or other information. For example, the size of the viewing window may be determined as the function of progress through the progress length of the video based on the size of the target depicted within the visual content as the function of progress through the progress length of the video and/or other information. For instance, the size of the viewing window may be determined based on the diagonal of the bounding box for the target, based on the distance between the tracking points of the target, and/or other information.

The viewing window may be sized to compensate for changes in size of the target such that a view of the visual content within the viewing window includes depiction of target that does not appear to change in size/not change in size more than a threshold amount. The size of the viewing window may be determined for different moments within the progress length. The amount by which the size of the viewing window is changed and whether the size increases or decreases may match the change in size of the target depicted in the visual content. The size of the viewing window may be changed to change the amount of cropping applied for the dolly zoom effect.

The position of the viewing window may be determined as the function of progress through the progress length of the video based on the position of the target depicted within the visual content as the function of progress through the progress length of the video and/or other information. For example, the position of the viewing window may be determined based on the center of the bounding box for the target, based on the center point between the tracking points for the target, and/or other information.

The viewing window may be positioned within the visual content to compensate for change in position of the target such that a view of the visual content within the viewing window includes depiction of face that does not appear to move/not move more than a threshold amount. The position of the viewing window may be determined for different moments within the progress length. The amount and direction by which the viewing window is moved may match the amount and direction by which the target moves in the visual content. The position of the viewing window may be changed to change where the viewing window is centered for the dolly zoom effect.

Figure 5:
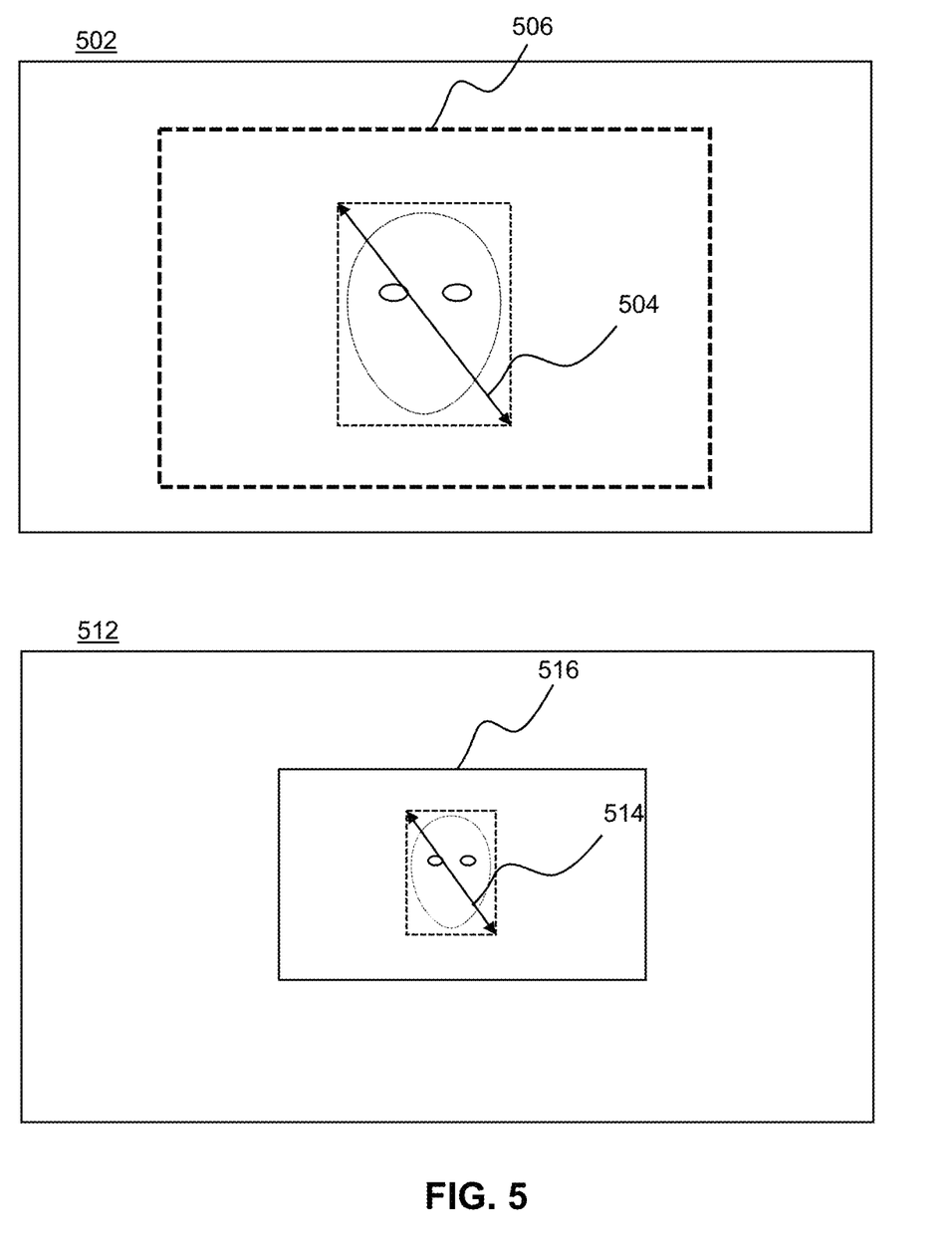
FIG. 5 illustrates an example change in size of a viewing window for visual content.

FIG. 5 illustrates an example change in size of a viewing window for visual content. An image 502 and an image 512 may include a depiction of a face. The size of the face may be determined using the diagonal of the bounding box for face. As shown in FIG. 5, the size of the face may decrease from a diagonal 504 to a diagonal 514. A viewing window 506 may be used to provide a punchout of the image 502. To maintain the size of the face from the punchout of the image 502 to the punchout of the image 512, a viewing window 516 may be used to provide the punchout of the image 512. The size of the viewing window 516 may be decreased to compensate for the size of the face decreasing from the image 502 to the image 512. Such a change in the size of the viewing window may result in the size of the face being maintained within the punchouts of the images 502, 512. The position of the face within the punchouts of the image 502, 512 may be maintained by keeping the bounding box for the face in the same relative location within the viewing windows 506, 516. For example, the center of the bounding box for the face may be kept at the center of the viewing windows 506, 516. Other relative placement of the bounding box is contemplated.

In some implementations, a zoom factor for the target may be determined based on a reference frame diagonal of the bounding box for the target, a current frame diagonal of the bounding box for the target, and/or other information. A zoom factor may refer to a value/amount by which the zoom/size of the viewing window should be adjusted to maintain the size of the target in the dolly zoom visual content. That is, the size of the viewing window may be determined based on the zoom factor for the target and/or other information. The reference frame diagonal may refer to the length (e.g., number of pixels) of the diagonal of the bounding box for the target in the reference video frame. The current frame diagonal may refer to the length of the diagonal of the bounding box for the garget in the current video frame for which the viewing window is being determined. For example, the zoom factor may be determined as a ratio of the reference frame diagonal of the bounding box for the target to the current frame diagonal of the bounding box for the target:

$$\text{zoom factor} = \text{reference frame diagonal} / \text{current frame diagonal}$$

In some implementations, the size of the viewing window may be determined based on distances between the tracking points (e.g., M, N) and/or other information. For example, the size of the viewing window may be changed based on changes in the distances between the tracking points for the target. In some implementations, the viewing window may be placed within the visual content based on a center point (e.g., C) between the tracking points and/or other information. For example, the center of the viewing window may be placed at the center point between the tracking points for the target.

The coordinates and size of the viewing window may be determined based on the tracking points (M, N, C). The following notations may be adopted for the determination of the coordinates and size of the viewing window:

$K_i$: Refers to the point K in frame i
$x_i^K$: x coordinate of point K at frame i
$y_i^K$: y coordinate of point K at frame i A corner of the viewing window may be positioned at the point with coordinates ($x_{offset}$, $y_{offset}$). The viewing window may have width ($W_{crop}$) and height ($H_{crop}$). The width and height of the reference images may be noted as W and H. The following condition may need to be fulfilled for the viewing window, with $M_1'$ and $N_1'$ being the position of M and N in the crop of the reference video frame.

$$\begin{cases} \dfrac{x_O^C}{W} = \dfrac{x_1^C - x_{offset}}{W_{crop}} & \text{condition 1} \\ \dfrac{y_O^C}{H} = \dfrac{y_1^C - y_{offset}}{H_{crop}} & \text{condition 1} \\ dist(M_0, N_0) = dist(M_1', N_1') & \text{condition 2} \end{cases}$$

The second condition may establish the following scale factor, width of the viewing window for the current video frame, and height of the viewing window for the current video frame:

$$\text{zoom} = \frac{dist(M_0, N_0)}{dist(M_1, N_1)}$$

$$W_{crop} = W / \text{zoom}$$

$$H_{crop} = H / \text{zoom}$$

Inserting the above into the first condition results in the following:

$$\begin{cases} x_{offset} = x_1^C - x_0^C * \dfrac{dist(M_1, N_1)}{dist(M_0, N_0)} \\ y_{offset} = y_1^C - y_0^C * \dfrac{dist(M_1, N_1)}{dist(M_0, N_0)} \end{cases}$$

And the viewing window may be defined to include the image between the following points:

$$x_{offset} \text{ and } x_{offset} + W * \frac{dist(M_1, N_1)}{dist(M_0, N_0)}$$

$$y_{offset} \text{ and } y_{offset} + H * \frac{dist(M_1, N_1)}{dist(M_0, N_0)}$$

In some implementations, the visual content may be stored in a buffer. The characteristic(s) (e.g., the size, the position) of the viewing window for the visual content stored in the buffer may change across frames. The changes in the characteristic(s) of the viewing window for the visual content stored in the buffer may be smoothed. For example, the changes in the size and/or the position of the viewing window for the visual content stored in the buffer may be filtered to make the changes smoother. For instance, the zoom factor for the viewing window may be filtered using the following, where $X_n$ is the zoom factor for video frame n and N is the number of video frames are stored in the buffer:

$$\bar{x}_n = \frac{1}{N} \sum_{k=0}^{N-1} x_{n-k}$$

The dolly zoom component 110 may be configured to generate dolly zoom visual content. The dolly zoom visual content may be generated based on the viewing window and/or other information. The dolly zoom visual content may include the extents of the visual content defined by the viewing window. The dolly zoom visual content may include a punchout of the extents (spatial portions) of the visual content within the viewing window. The dolly zoom visual content may be generated as images/video frames including the extents of the visual content within the viewing window. Inclusion of the extents of the visual content within the viewing window in the dolly zoom visual content may effectuate application of the dolly zoom effect via selective cropping. The portions of the visual content that are cropped for application of the dolly zoom effect may depending on the size, the position, and/or other characteristics of the target within the visual content as the function of progress through the progress length of the video.

The dolly zoom visual content may include depiction of the target with the dolly zoom effect applied. For example, the dolly zoom visual content may include depiction of a scene including the target. The size and/or the position of the target may be maintained across multiple frames of the dolly zoom visual content. The field of view of the scene may be changed across the multiple frames of the dolly zoom visual content.

In some implementations, the dolly zoom visual content may be generated as the visual content is captured by an image capture device. The dolly zoom visual content may be presented on an electronic display as the visual content is captured by the image capture device. For example, the dolly zoom visual content may be generated as an image capture device is capturing the visual content, and the dolly zoom visual content may be presented on an electronic display of the image capture device as a preview/live-view of the visual content being captured by the image capture device.

In some implementations, the dolly zoom visual content may be generated as an encoded video (e.g., an encoded video file). For example, the dolly zoom visual content may be encoded and stored in a particular video clip, and the video clip may be opened in a video player for presentation. In some implementations, the dolly zoom visual content may be generated as instruction identifying/defining how the visual content is to be presented on playback. For example, the dolly zoom visual content may be generated as a set of instruction defining the viewing window to be used in generating a presentation of the dolly zoom visual content. A video play use the instructions to apply the dolly zoom effect during visual content playback.

In some implementations, generation of the dolly zoom visual content may be stopped based on resolution of the target within the visual content and/or the dolly zoom visual content. For example, increasing the zoom level/reducing the size of the viewing window to generate the dolly zoom visual content may result in reduction of resolution. It may be desirable to limit the dolly zoom visual content from having resolution lower than a threshold resolution. If the resolution of the target within the visual content and/or the dolly zoom visual content is too low (e.g., lower than the threshold resolution), generation of the dolly zoom visual content may be stopped.

In some implementations, generation of the dolly zoom visual content may be restarted based on resolution of the target within the visual content and/or the dolly zoom visual content. For example, if the resolution of the target within the visual content and/or the dolly zoom visual content is sufficiently high (e.g., higher than the threshold resolution), generation of the dolly zoom visual content may be restarted.

In some implementations, an output video may be generated to include original visual content and dolly zoom visual content. For example, for portions of the video in which the target has sufficient resolution, the dolly zoom visual content may be generated. For portions of the video in which the target lacks sufficient resolution, the dolly zoom visual content may not be generated. The output video may be generated to include the original visual content when the target lacks sufficient resolution and include the dolly zoom visual content when the target has sufficient resolution. The output video may include the original visual content when the target lacks sufficient resolution and include the dolly zoom visual content when the target has sufficient resolution.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a nontransitory, tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
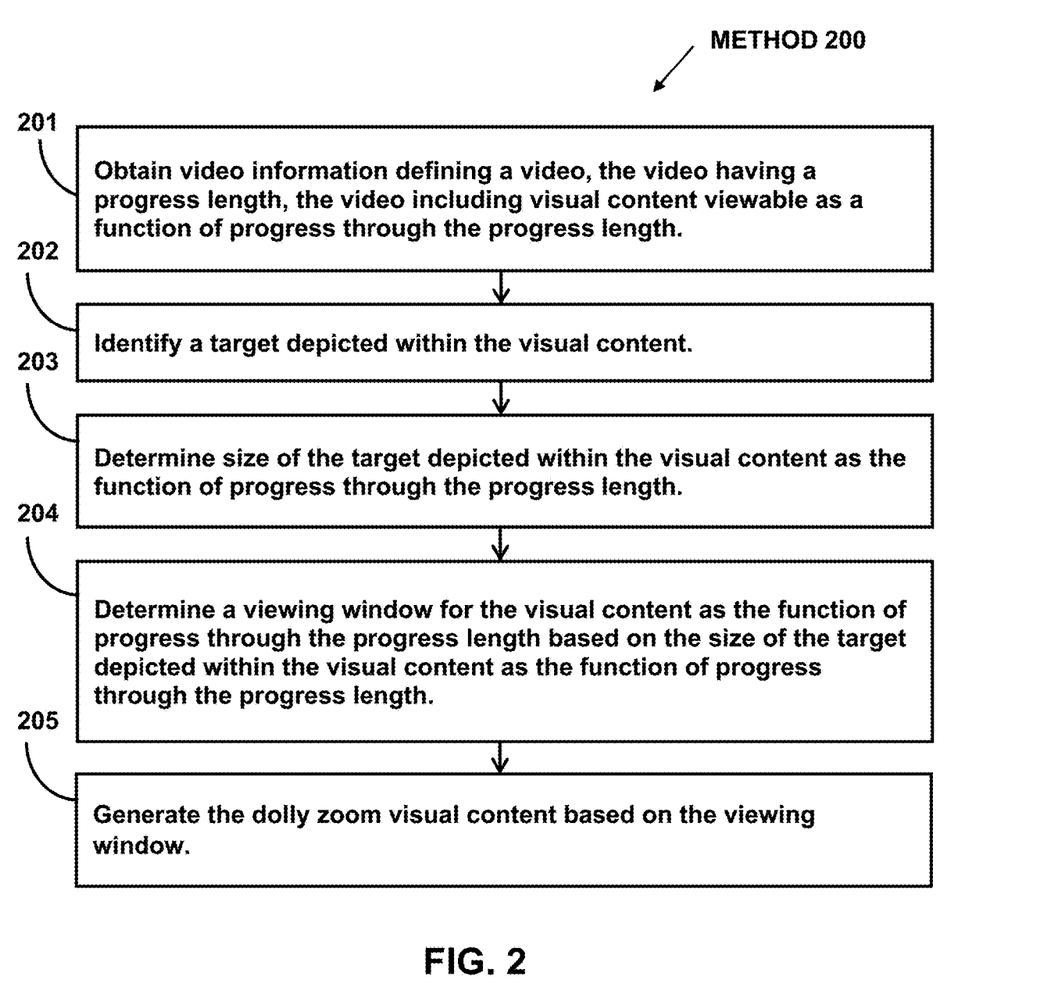
FIG. 2 illustrates a method for applying a dolly zoom effect.

FIG. 2 illustrates method 200 for applying a dolly zoom effect. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may have a progress length. The video may include visual content viewable as a function of progress through the progress length. In some implementations, operation 201 may be performed by a processor component the same as or similar to the video component 102 (Shown in FIG. 1 and described herein).

At operation 202, a target depicted within the visual content may be identified. In some implementations, operation 202 may be performed by a processor component the same as or similar to the target component 104 (Shown in FIG. 1 and described herein).

At operation 203, size of the target depicted within the visual content may be determined as the function of progress through the progress length. In some implementations, operation 203 may be performed by a processor component the same as or similar to the depiction component 106 (Shown in FIG. 1 and described herein).

At operation 204, a viewing window for the visual content may be determined as the function of progress through the progress length based on the size of the target depicted within the visual content as the function of progress through the progress length and/or other information. The viewing window may define extents of the visual content to be included within dolly zoom visual content as the function of progress through the progress length. In some implementations, operation 204 may be performed by a processor component the same as or similar to the viewing window component 108 (Shown in FIG. 1 and described herein).

At operation 205, the dolly zoom visual content may be generated based on the viewing window and/or other information. The dolly zoom visual content may include the extents of the visual content defined by the viewing window. In some implementations, operation 205 may be performed by a processor component the same as or similar to the dolly zoom component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for applying a dolly zoom effect, the system comprising:
one or more physical processors configured by machine-readable instructions to:
obtain video information defining a video, the video having a progress length, the video including visual content viewable as a function of progress through the progress length, the visual content captured by an image capture device with a fixed focal length, wherein the video includes a normal speed video, a slow speed video, or a fast speed video;
identify a target depicted within the visual content;
determine a size of the target depicted within the visual content as the function of progress through the progress length;
determine a size of a viewing window for the visual content as the function of progress through the progress length based on the size of the target depicted within the visual content as the function of progress through the progress length, the viewing window defining extents of the visual content to be included within dolly zoom visual content as the function of progress through the progress length; and
edit the visual content captured by the image capture device with fixed focal length to generate the dolly zoom visual content without physically adjusting the fixed focal length of the image capture device, the dolly zoom visual content including a punchout of the extents of the visual content defined by the viewing window, wherein the dolly zoom visual content is generated as the visual content is captured by the image capture device;
wherein:
the image capture device is configured to provide guidance to a user in capturing the visual content;
the image capture device is configured to prompt the user to choose between a first dolly zoom effect for moving away the target and a second dolly zoom effect for moving towards from the target;
responsive to user selection of the first dolly zoom effect for moving away from the target, the image capture device is configured to prompt the user to position the image capture device with respect to the target to choose a reference size for the target, wherein capture of the visual content is started after the reference size for the target has been chosen by the user; and
responsive to user selection of the second dolly zoom effect for moving towards from the target, the image capture device is configured to prompt the user to position the image capture device with respect to the target to choose the reference size for the target, the image capture device is further configured to prompt the user to step away from the target after the reference size for the target has been chosen, wherein capture of the visual content is started after the user has added distance between the image capture device and the target.

2. The system of claim 1, wherein:
the visual content is stored in a buffer;
the size of the viewing window for the visual content stored in the buffer changes across frames;
the changes in the size of the viewing window for the visual content stored in the buffer are smoothed; and
the dolly zoom visual content is presented on an electronic display as the visual content is captured by the image capture device.

3. The system of claim 1, wherein:
the video is stabilized to provide a more stable view of the visual content; and
the dolly zoom visual content is generated from the stabilized video by changing the size of the viewing window and without changing position of the viewing window.

4. The system of claim 1, wherein the video includes a normal speed video, a slow speed video, or a fast speed video.

5. A system for applying a dolly zoom effect, the system comprising:
one or more physical processors configured by machine-readable instructions to:
obtain video information defining a video, the video having a progress length, the video including visual content viewable as a function of progress through the progress length, the visual content captured by an image capture device with a fixed focal length;
identify a target depicted within the visual content;
determine a size of the target depicted within the visual content as the function of progress through the progress length;
determine a size of a viewing window for the visual content as the function of progress through the progress length based on the size of the target depicted within the visual content as the function of progress through the progress length, the viewing window defining extents of the visual content to be included within dolly zoom visual content as the function of progress through the progress length; and
edit the visual content captured by the image capture device with fixed focal length to generate the dolly zoom visual content, the dolly zoom visual content including a punchout of the extents of the visual content defined by the viewing window;
wherein:
the image capture device is configured to provide guidance to a user in capturing the visual content;
the image capture device is configured to prompt the user to choose between a first dolly zoom effect for moving away the target and a second dolly zoom effect for moving towards from the target;
responsive to user selection of the first dolly zoom effect for moving away from the target, the image capture device is configured to prompt the user to position the image capture device with respect to the target to choose a reference size for the target, wherein capture of the visual content is started after the reference size for the target has been chosen by the user; and
responsive to user selection of the second dolly zoom effect for moving towards from the target, the image capture device is configured to prompt the user to position the image capture device with respect to the target to choose the reference size for the target, the image capture device is further configured to prompt the user to step away from the target after the reference size for the target has been chosen, wherein capture of the visual content is started after the user has added distance between the image capture device and the target.

6. The system of claim 5, wherein:
the dolly zoom visual content includes depiction of a scene including the target;
the size and/or position of the target are maintained across multiple frames of the dolly zoom visual content; and
field of view of the scene are changed across the multiple frames of the dolly zoom visual content.

7. The system of claim 5, wherein:
identification of the target depicted within the visual content includes identification of a bounding box for the target;
determination of the size of the target depicted within the visual content as the function of progress through the progress length includes determination of a diagonal of the bounding box for the target as the function of progress through the progress length;
a zoom factor for the target is determined based on a reference frame diagonal of the bounding box for the target and a current frame diagonal of the bounding box for the target; and
the size of the viewing window is determined based on the zoom factor for the target.

8. The system of claim 5, wherein:
the video is stabilized to provide a more stable view of the visual content; and
the dolly zoom visual content is generated from the stabilized video by changing the size of the viewing window and without changing position of the viewing window.

9. The system of claim 5, wherein:
identification of the target depicted within the visual content includes selection of an object or identification of a region of interest within the visual content;
trackability of points of the object or points within the region of interest within the visual content are determined across multiple frames, the trackability of points including quality of the point being able to be tracked across the multiple frames;
tracking points for the object or the region of interest are selected based on the trackability and distances between the points of the object or the points within the region of interest within the visual content, wherein the points of the object or the points within the region of interest with (1) highest trackability and (2) longest distance or distance longer than a threshold distance are selected as the tracking points;
the size of the viewing window is determined based on distances between the tracking points; and
the viewing window is placed within the visual content based on center points of distances between the tracking points across the multiple frames.

10. The system of claim 5, wherein:
the visual content is stored in a buffer;
the size of the viewing window for the visual content stored in the buffer changes across frames; and
the changes in the size of the viewing window for the visual content stored in the buffer are smoothed.

11. The system of claim 5, wherein generation of the dolly zoom visual content is stopped based on resolution of the target within the visual content and/or the dolly zoom visual content.

12. The system of claim 5, wherein the video includes a normal speed video, a slow speed video, or a fast speed video.

13. A method for applying a dolly zoom effect, the method performed by a computing system including one or more processors, the method comprising:
  obtaining, by the computing system, video information defining a video, the video having a progress length, the video including visual content viewable as a function of progress through the progress length, the visual content captured by an image capture device with a fixed focal length;
  identifying, by the computing system, a target depicted within the visual content;
  determining, by the computing system, a size of the target depicted within the visual content as the function of progress through the progress length;
  determining, by the computing system, a size of a viewing window for the visual content as the function of progress through the progress length based on the size of the target depicted within the visual content as the function of progress through the progress length, the viewing window defining extents of the visual content to be included within dolly zoom visual content as the function of progress through the progress length; and
  editing, by the computing system, the visual content captured by the image capture device with fixed focal length to generate the dolly zoom visual content, the dolly zoom visual content including a punchout of the extents of the visual content defined by the viewing window;
  wherein:
    the image capture device is configured to provide guidance to a user in capturing the visual content;
    the image capture device is configured to prompt the user to choose between a first dolly zoom effect for moving away the target and a second dolly zoom effect for moving towards from the target;
    responsive to user selection of the first dolly zoom effect for moving away from the target, the image capture device is configured to prompt the user to position the image capture device with respect to the target to choose a reference size for the target, wherein capture of the visual content is started after the reference size for the target has been chosen by the user; and
    responsive to user selection of the second dolly zoom effect for moving towards from the target, the image capture device is configured to prompt the user to position the image capture device with respect to the target to choose the reference size for the target, the image capture device is further configured to prompt the user to step away from the target after the reference size for the target has been chosen, wherein capture of the visual content is started after the user has added distance between the image capture device and the target.

14. The method of claim 13, wherein:
  the dolly zoom visual content includes depiction of a scene including the target;
  the size and/or position of the target are maintained across multiple frames of the dolly zoom visual content; and
  field of view of the scene are changed across the multiple frames of the dolly zoom visual content.

15. The method of claim 13, wherein:
  identifying the target depicted within the visual content includes identifying a bounding box for the target;
  determining the size of the target depicted within the visual content as the function of progress through the progress length includes determining a diagonal of the bounding box for the target as the function of progress through the progress length;
  a zoom factor for the target is determined based on a reference frame diagonal of the bounding box for the target and a current frame diagonal of the bounding box for the target; and
  the size of the viewing window is determined based on the zoom factor for the target.

16. The method of claim 13, wherein:
  the video is stabilized to provide a more stable view of the visual content; and
  the dolly zoom visual content is generated from the stabilized video by changing the size of the viewing window and without changing position of the viewing window.

17. The method of claim 13, wherein:
  identifying the target depicted within the visual content includes selecting an object or identifying a region of interest within the visual content;
  trackability of points of the object or points within the region of interest within the visual content are determined across multiple frames, the trackability of points including quality of the point being able to be tracked across the multiple frames;
  tracking points for the object or the region of interest are selected based on the trackability and distances between the points of the object or the points within the region of interest within the visual content, wherein the points of the object or the points within the region of interest with (1) highest trackability and (2) longest distance or distance longer than a threshold distance are selected as the tracking points;
  the size of the viewing window is determined based on distances between the tracking points; and
  the viewing window is placed within the visual content based on center points of distances between the tracking points across the multiple frames.

18. The method of claim 13, wherein:
  the visual content is stored in a buffer;
  the size of the viewing window for the visual content stored in the buffer changes across frames; and
  the changes in the size of the viewing window for the visual content stored in the buffer are smoothed.

19. The method of claim 13, wherein generating the dolly zoom visual content is stopped based on resolution of the target within the visual content and/or the dolly zoom visual content.

20. The method of claim 13, wherein the video includes a normal speed video, a slow speed video, or a fast speed video.

* * * * *